United States Patent
Wiencke et al.

(10) Patent No.: US 9,507,600 B2
(45) Date of Patent: Nov. 29, 2016

(54) PROCESSOR LOOP BUFFER

(71) Applicant: TEXAS INSTRUMENTS DEUTSCHLAND GMBH, Freising (DE)

(72) Inventors: Christian Wiencke, Garching (DE); Ralph Ledwa, Buching (DE); Norbert Reichel, Wartenberg (DE)

(73) Assignee: TEXAS INSTRUMENTS DEUTSCHLAND GMBH, Freising (DE)

( * ) Notice: Subject to any disclaimer, the term of this patent is extended or adjusted under 35 U.S.C. 154(b) by 353 days.

(21) Appl. No.: 14/164,633

(22) Filed: Jan. 27, 2014

(65) Prior Publication Data

US 2015/0212820 A1    Jul. 30, 2015

(51) Int. Cl.
*G06F 9/32*    (2006.01)
*G06F 9/38*    (2006.01)

(52) U.S. Cl.
CPC .............. *G06F 9/325* (2013.01); *G06F 9/381* (2013.01)

(58) Field of Classification Search
CPC ................. G06F 9/325; G06F 9/381
See application file for complete search history.

(56) References Cited

U.S. PATENT DOCUMENTS

| | | | |
|---|---|---|---|
| 5,809,273 A * | 9/1998 | Favor | G06F 9/30152 712/210 |
| 5,953,512 A | 9/1999 | Cai et al. | |
| 6,189,092 B1 * | 2/2001 | Ogura | G06F 9/325 712/234 |
| 6,598,155 B1 | 7/2003 | Ganapathy et al. | |
| 9,274,951 B2 * | 3/2016 | Evans | G06F 12/0802 |
| 2002/0178350 A1 | 11/2002 | Chung et al. | |
| 2007/0113058 A1 | 5/2007 | Tran et al. | |
| 2007/0239975 A1 * | 10/2007 | Wang | G06F 9/325 712/241 |

* cited by examiner

*Primary Examiner* — Eric Coleman
(74) *Attorney, Agent, or Firm* — John R. Pessetto; Charles A. Brill; Frank D. Cimino (57) ABSTRACT

A method and apparatus for executing program loops. A processor, includes an execution unit and an instruction fetch buffer. The execution unit is configured to execute instructions. The instruction fetch buffer is configured to store instructions for execution by the execution unit. The instruction fetch buffer includes a loop buffer configured to store instructions of an instruction loop for repeated execution by the execution unit. The loop buffer includes buffer control logic. The buffer control logic includes pointers, and is configured to predecode a loop jump instruction, identify loop start and loop end instructions using the predecoded loop jump instruction and pointers; and to control non-sequential instruction execution of the instruction loop. The width of the pointers is determined by loop buffer length and is less than a width of an address bus for fetching the instructions stored in the loop buffer from an instruction memory.

21 Claims, 7 Drawing Sheets

PROCESSOR LOOP BUFFER

BACKGROUND

Program loops are sequences of instructions that are repeatedly executed. Program loops are frequently employed in various types of software. In a typical program loop, a conditional jump or branch instruction at the end of the loop conditionally redirects execution to the start of the loop. When a loop is executed more than once by a processor, the instructions of the loop may be read multiple times from instruction memory. Repeated access of memory to fetch loop instructions increases energy consumption. Additionally, execution of the loop jump instruction may cause the processor pipeline to stall while awaiting jump decision status or fetching the jump destination instruction from the instruction memory. Stall cycles reduce processor performance. Thus, while incorporation of program loops effectively reduces program size, loop execution can detrimentally affect processor performance.

SUMMARY

A method and apparatus for loop buffering and execution are disclosed herein. In one embodiment, a processor includes an execution unit and an instruction fetch buffer. The execution unit is configured to execute instructions. The instruction fetch buffer is configured to store instructions for execution by the execution unit. The instruction fetch buffer is operable to provide a loop buffer configured to store instructions of an instruction loop for repeated execution by the execution unit. The loop buffer includes buffer control logic and pointers. The buffer control logic is configured to predecode a loop jump instruction and to identify loop start and loop end instructions using the pre-decoded loop jump instruction and the pointers; and to control non-sequential instruction execution of the instruction loop. The width of the pointers is determined by loop buffer length and is less than a width of an address bus for fetching the instructions stored in the loop buffer from an instruction memory.

In another embodiment, an instruction fetch buffer includes a loop buffer configured to store instructions of an instruction loop for execution by an execution unit. The loop buffer includes buffer control logic comprising pointers, and is configured to identify loop start and loop end instructions using the pointers, to identify which instructions, stored in the instruction buffer, are executed as part of the instruction loop, and to control non-sequential instruction execution of an instruction loop. The width of the pointers is determined by loop buffer length and is less than a width of an address bus for fetching the instructions stored in the loop buffer from an instruction memory.

In a further embodiment, a method includes partitioning an instruction fetch buffer into a loop buffer and a pre-fetch buffer. Instructions of an instruction loop read from an instruction memory are stored in the loop buffer. A location of a loop branch instruction stored in the loop buffer and a location of a branch destination of the loop branch instruction in the loop buffer are identified by loop control logic of the loop buffer. A first pointer to the location of the loop branch instruction and a second pointer to a location of the branch destination of the loop branch instruction are set by the loop control logic. An instruction pointed to by the second pointer is provided by the loop buffer immediately subsequent to providing the loop branch instruction pointed to by the first pointer without introduction of stall cycles into execution. A forward branch in the instruction loop stored in the loop buffer is identified. An instruction at a branch destination location for the forward branch instruction is provided, by and from the loop buffer, immediately subsequent to providing the forward branch without introduction of stall cycles into execution.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of additional factors.

The terms "branch" and "jump" are used herein as equivalents to refer to a discontinuity in instruction retrieval and execution. Accordingly, the terms "loop jump" and "loop branch" are used as equivalents.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Conventional processor architectures apply general purpose caches or special loop caches to improve loop execution efficiency. Such constructs can reduce memory energy consumption and reduce the number of stall cycles, thereby increasing processor performance. Loop acceleration caches store instruction data and address information, and include address comparison logic for comparing fetch addresses with the stored address. Depending on the cache architecture (e.g., the number of associative sets) the number of stored addresses and address comparators differs. For supporting nested loops and if-then/if-then-else branch constructs within loops conventional architectures implement separate associative cache ways that require additional address storage and comparators.

Caches that store a large number of addresses and include a large number of address comparators can provide a high cache hit rate at the expense of high gate count and high energy consumption. Some caches may store a small number of addresses and include few address comparators thereby producing a lower cache hit rate with lower gate count and lower energy consumption. Thus, caches, including conventional specialized loop caches, are a compromise between increasing cache hit rate and reducing the number of included address comparators. In conventional architectures, the number of address comparators determines the number of nesting levels and branches supported in a cached loop.

Embodiments of the present disclosure include a loop buffer formed in the instruction fetch buffer of a processor. The loop buffer includes pointer logic that controls fetching of loop instructions from the loop buffer. By controlling looping via pointers rather than address comparators, embodiments provide improved loop performance while reducing power consumption and gate count relative to conventional loop caches that provide equivalent performance.

Figure 1:
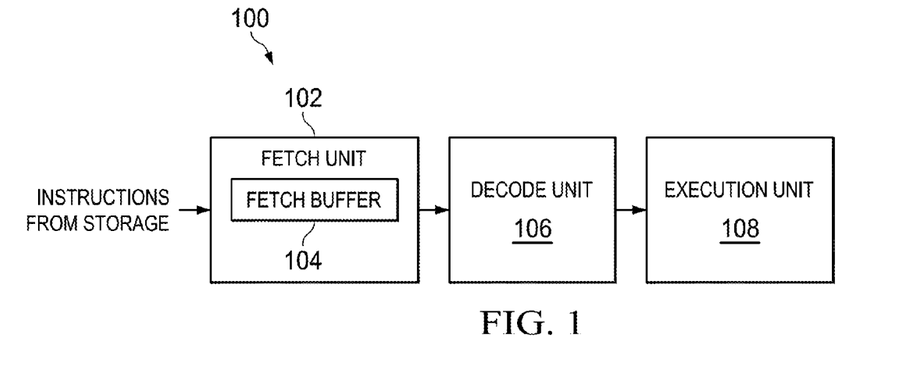
FIG. 1 shows a block diagram of a processor in accordance with various embodiments.

FIG. 1 shows a block diagram of a processor 100 in accordance with various embodiments. The processor 100 may be a general purpose microprocessor, a digital signal processor, a microcontroller, or other computing device that executes instructions retrieved from a memory device. The processor 100 includes a fetch unit 102, a decode unit 106, and an execution unit 108. The fetch unit 102 retrieves instructions from a storage device, such as a memory, for execution by the processor 100. The fetch unit 102 provides the retrieved instructions to the decode unit 106.

The decode unit 106 examines the instructions received from the fetch unit 102, and translates each instruction into controls suitable for operating the execution unit 108, processor registers, and other components of the processor 100 to perform operations that effectuate the instructions. In some embodiments of the processor 100, various operations associated with instruction decoding may be performed in the fetch unit 102 or another operational unit of the processor 100. The decode unit 106 provides control signals to the execution unit 108 that cause the execution unit 108 to carry out the operations needed to execute each instruction.

The execution unit 108 includes arithmetic circuitry, shifters, multipliers, registers, logical operation circuitry, etc. that are arranged to manipulate data values as specified by the control signals generated by the decode unit 106. Some embodiments of the processor 100 may include multiple execution units that include the same or different data manipulation capabilities.

The processor 100 may include various other components that have omitted from FIG. 1 as a matter of clarity. For example, embodiments of the processor 100 may include instruction and/or data caches, memory, communication devices, interrupt controllers, timers, clock circuitry, direct memory access controllers, and various other components and peripherals.

The fetch unit 102 includes a fetch buffer 104. The fetch buffer 104 provides storage for instructions pre-fetched from instruction storage, e.g., fetched from a memory device external to the processor 100 that stores instructions. By pre-fetching instructions, the processor 100 can provide stored instructions for execution without the delays often associated with fetching instructions from a memory device that may be unable to provide instructions at as high a rate as the processor 100 is able to execute the instructions. The fetch buffer 104, or a portion thereof, is arranged to operate as a loop buffer that recognizes and stores instructions of an instruction loop fetched from memory.

Figure 2:
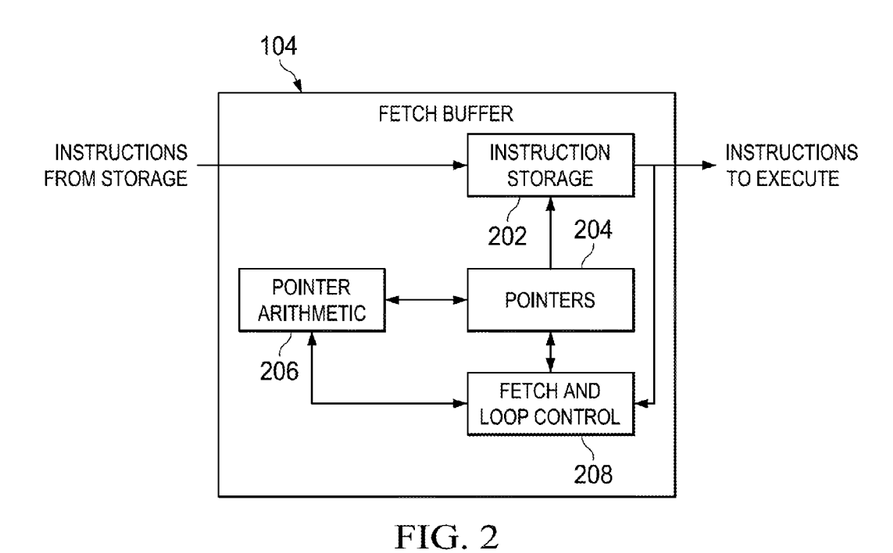
FIG. 2 shows a block diagram of a fetch buffer in accordance with various embodiments.

FIG. 2 shows a block diagram of the fetch buffer 104 in accordance with various embodiments. The fetch buffer 104 includes instruction storage 202, pointers 204, pointer arithmetic logic 206, and fetch/loop control logic 208. The instruction storage 202 includes an array of storage cells, such as registers and/or memory devices that store instructions retrieved from an instruction storage device, such as a memory external to the processor 100. Instructions stored in the instruction storage 202 are provided to the decoder 106 for execution by the execution unit 108. The instruction storage 202 may include storage for any number of instructions. For example, embodiments of the instruction storage 202 may store 16, 32, 64, 128, or another number of instruction words. Similarly, the storage cells of the instruction storage 202 may be of any width needed to store instructions executed by the processor 100. For example, the storage cells may be 16 bits in width if the processor 100 executes 16-bit instructions, 32 bits in width if the processor 100 executions 32-bit instructions, etc. As instructions are fetched and loaded into the fetch buffer 104, the fetched instructions may be sequentially stored in the instruction storage 202.

Access to the instruction storage 202, for reading or writing, is provided via the pointers 204. The pointers 204 are registers that provide values for addressing the instruction storage 202, and include a read pointer for reading instructions from the instruction storage 202, a write pointer for writing instructions to the instruction storage 202, and pointers that identify loop start and loop end locations in the instruction storage 202. The pointers 204 may include any number of pointer registers. For example, four pointer registers comprising a read pointer, a write pointer, and two loop pointers may be included in the pointers 204. The width of each pointer may be determined based on the number of the storage cells included in the instruction storage 202. For example, if the instruction storage 202 includes 16 storage cells, then each pointer may be 4 bits wide; if the instruction storage 202 includes 32 storage cells, then each pointer may be 5 bits wide, etc. Thus, the pointers accessing the instruction storage 202 may be substantially smaller than the addresses used to access the memory from which the instructions are fetched into the instruction storage 202. For example, the address values used to access an external memory, and address values included in the instructions fetched may be 16 or more bits wide, while the pointers 204 may be 4 bits wide.

The pointer arithmetic logic 206 is coupled to the pointers 204, and includes circuitry for arithmetically manipulating the values stored in the pointers. The pointer arithmetic logic 206 may include adders, shifters, etc. for changing the value stored in a given one of the pointers 204. For example, the pointer arithmetic 206 may add an offset value to a pointer 204 to set the pointer to a branch destination in the instruction storage 202.

The fetch/loop control logic 208 controls the operation of the fetch buffer 104. At least a portion of the instruction storage 202 may be used to store instructions of an instruction loop and repetitively provide the instructions to the decode unit 106 for execution by the execution unit 108.

Thus, the fetch/loop control logic 208 may allocate a portion of the instruction storage 202 for use as a loop buffer and a portion of the instruction storage 202 for use as a pre-fetch buffer. Instructions stored in the pre-fetch buffer may be replaced by a newly fetched instruction after being provided to the decode unit 106 a single time. In contrast, instructions stored in the loop buffer may be replaced only after execution of an instruction loop including the instructions is complete.

The fetch/loop control logic 208 includes logic that recognizes instructions included in an instruction loop and manages the forwarding of loop instructions to the decode unit 106. The fetch/loop control logic 208 predecodes and examines the instructions written to and/or read from the instruction storage 202 to identify loop jump instructions and other instructions associated with instruction loops (e.g., loop identification instructions, forward branch instructions call/return instructions, etc.). In some embodiments, a loop identifier that identifies the start of the instruction loop may be included before or at the beginning of the instruction loop. The loop identifier may be a dedicated instruction or a field of an instruction. Following the loop identifier, the fetch/loop control logic 208 may identify all instructions encountered as part of the instruction loop until a branch or jump instruction is encountered that redirects execution to the start of the loop, i.e., to the loop identifier or one sequential instruction after the loop identifier.

The fetch/loop control logic 208 uses the pointers 204 and the pointer arithmetic logic 206 to manage instruction loops. The fetch/loop control logic 208 may initialize a pointer (loop start pointer) to the location of the loop identifier at the start of the instruction loop, and initialize a pointer (loop end pointer) to the location of the branch/jump instruction at the end of the instruction loop. When the instruction at the loop end pointer is provided to the decode unit 106, the fetch/loop control logic 208 may immediately thereafter provide the instruction at the loop start pointer to the decode unit 106. The fetch/loop control logic 208 may provide this instruction flow change by comparing the current read pointer for reading instruction words from the instruction storage 202 to the previously set loop end pointer. If equal, the read pointer will be updated to the loop start pointer for the next cycle, thereby eliminating stall cycles from the non-sequential execution of instructions.

In some embodiments, the fetch/loop control logic 208 identifies the branch/jump instruction of an instruction loop, and thereafter identifies the start of the instruction loop as the destination of the branch/jump. In some embodiments, the loop branch instruction may include a field that identifies the branch as a loop branch. The fetch/loop control logic 208 may initialize a pointer (loop end pointer) to the location of the branch/jump instruction at the end of the instruction loop, and initialize a pointer (loop start pointer) to the location of the destination of the branch/jump instruction at the start of the instruction loop. Instructions executed between the loop start pointer and the loop end pointer may be tagged as instructions of the instruction loop.

Because the logic needed to maintain and use the pointers 204 is substantially smaller in size and energy consumption than equivalent logic that uses memory addresses, embodiments of the fetch buffer 104 provide a substantial improvement in efficiency over conventional solutions. The fetch buffer 104 may support any number of nested loops using only the buffer read pointer, buffer write pointer, loop start pointer, and loop end pointer disclosed herein.

Figure 3:
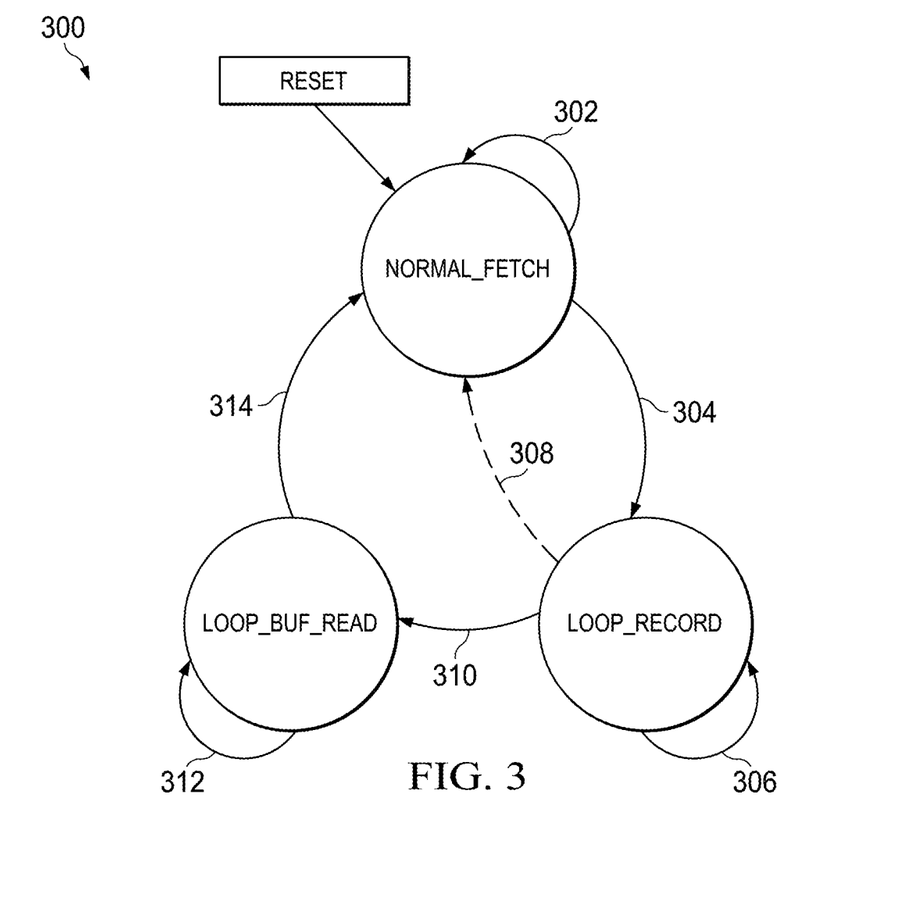
FIG. 3 shows an exemplary state diagram for buffer control logic in accordance with various embodiments.

FIG. 3 shows an exemplary state diagram for loop control operations of the fetch/loop control logic 208. At reset, the logic 208 enters the NORMAL_FETCH state and while no loop start identifier is detected or a loop jump is taken 302, instructions are fetched from memory, sequentially stored in the instruction storage 202, and tagged for replacement after execution.

When an instruction loop is identified 304 (e.g., a loop identifier or a taken loop jump is identified), fetch/loop control logic 208 transitions to the LOOP_RECORD state. Pointers are set to identify the locations of the loop jump instruction and the jump destination instruction in the instruction storage 202. Write and read pointers may be set to record and read the loop from the start of the loop (i.e., the loop jump destination). Instructions of the loop are loaded into the instruction storage 202.

If while in the LOOP_RECORD state, the instruction loop is aborted (i.e., a discontinuity such as an interrupt is encountered or a branch to a destination outside of the loop is taken), then the LOOP_RECORD state is exited 308, and the NORMAL_FETCH state is re-entered. When re-entering the NORMAL_FETCH state, the instruction storage 202 may be cleared and reloaded with instructions fetched from memory at the new execution address.

When the loop is repeated (i.e., the loop jump instruction is executed) 310, the LOOP_BUF_READ state is entered. In the LOOP_BUF_READ state the loop instructions are sequentially provided to the decode unit 106 until a jump/branch instruction is encountered, at which time the instruction at the destination pointer may be provided (e.g., in accordance with branch conditions). Thus, the fetch/loop control logic 208 can accelerate nested instruction loops, forward branches (conditionals, such as if-then-else constructs) located within an instruction loop, and other instruction flow discontinuities occurring in an instruction loop.

When the instruction loop is complete (314) (i.e., the loop jump is not taken) or the instruction loop is aborted (i.e., a discontinuity such as an interrupt is encountered or a branch to a destination outside of the loop is taken), the LOOP_BUF_READ state is exited, and the NORMAL_FETCH state is re-entered. When re-entering the NORMAL_FETCH state, the instruction storage 202 may be cleared and reloaded with post-loop instructions fetched from memory.

While the state diagram 300 illustrates one example of loop buffer control, some embodiments may implement other control methods. For example, if a loop identification flag is provided before or at the start of the instruction loop, then control logic 208 may begin recording loop instructions when the start of the loop is stored in the instruction storage 202.

Figure 4:
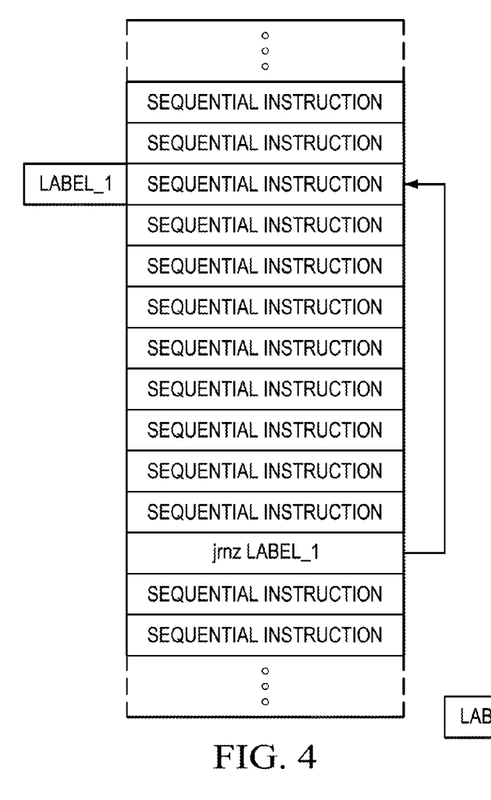
FIGS. 4-8 show instruction loops stored in a loop buffer in accordance with various embodiments.

FIGS. 4-8 show instruction loops stored in a loop buffer portion of the fetch buffer 104 in accordance with various embodiments. FIG. 4 shows an instruction loop identified by LABEL_1. The instructions of the loop have been fetched and stored in the instruction storage 202, and loop start and end pointers of the pointers 204 have been set to the locations of the instruction at LABEL_1 and the corresponding loop jump/branch instruction. As the loop is executed, the read pointer of the pointers 204 sequentially advances until equal to the loop end pointer (i.e., the read pointer points to the loop jump instruction), at which time the read pointer may be loaded with the value of the loop start pointer to fetch the instruction at LABEL_1.

Figure 5:
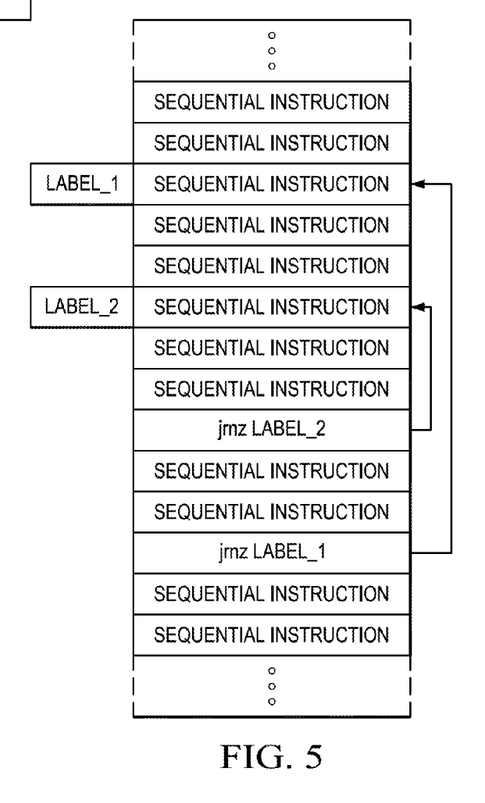

FIG. 5 shows a first instruction loop identified by LABEL_1 and a second instruction loop identified by LABEL_2 nested within the first instruction loop. The instructions of both loops have been fetched and stored in the instruction storage 202, and pointers 204 have been set to the locations of the instruction at LABEL_1 and the corresponding loop jump/branch instruction. When the loop jump instruction referring to LABEL_1 is executed, the fetch/loop control logic 208 can apply the pointer to the jump destination instruction (LABEL_1) to provide the instruction without stall cycles. When the loop jump instruction referring to LABEL_2 is executed, the fetch/loop control logic 208 applies the pointer arithmetic logic 206 to update the read pointer according to the offset value provided in the loop jump instruction. The updated read pointer will point to the instruction at LABEL_2. As long as the outermost loop fits into the loop buffer, any number of nested loops may be accommodated because use of the pointers 204 incurs no additional per loop overhead.

Figure 6:
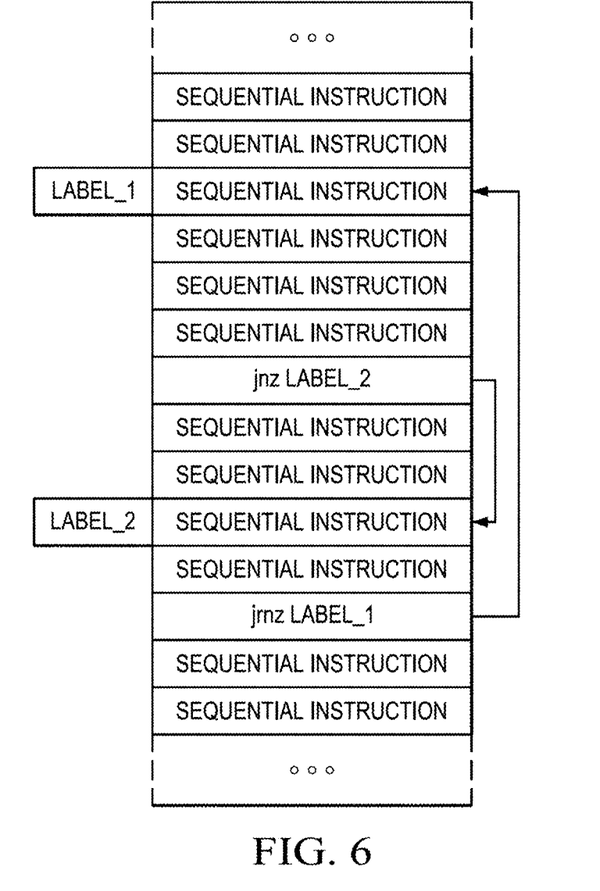

FIG. 6 shows an instruction loop identified by LABEL_1 stored in the instruction storage 202. The instruction loop includes a forward branch/jump associated with LABEL_2. The forward branch may result from a conditional construct, such as if-then. Pointers 204 have been set to the locations of the instructions at LABEL_1 and the corresponding loop jump. The fetch/loop control logic 208 handles the forward branch/jump within the loop by updating the read pointer in accordance with the offset value provided by the forward branch/jump instruction. When either jump/branch instruction is executed, the fetch/loop control logic 208 can apply the read pointer to the corresponding jump destination instruction to provide the instruction without stall cycles.

Figure 7:
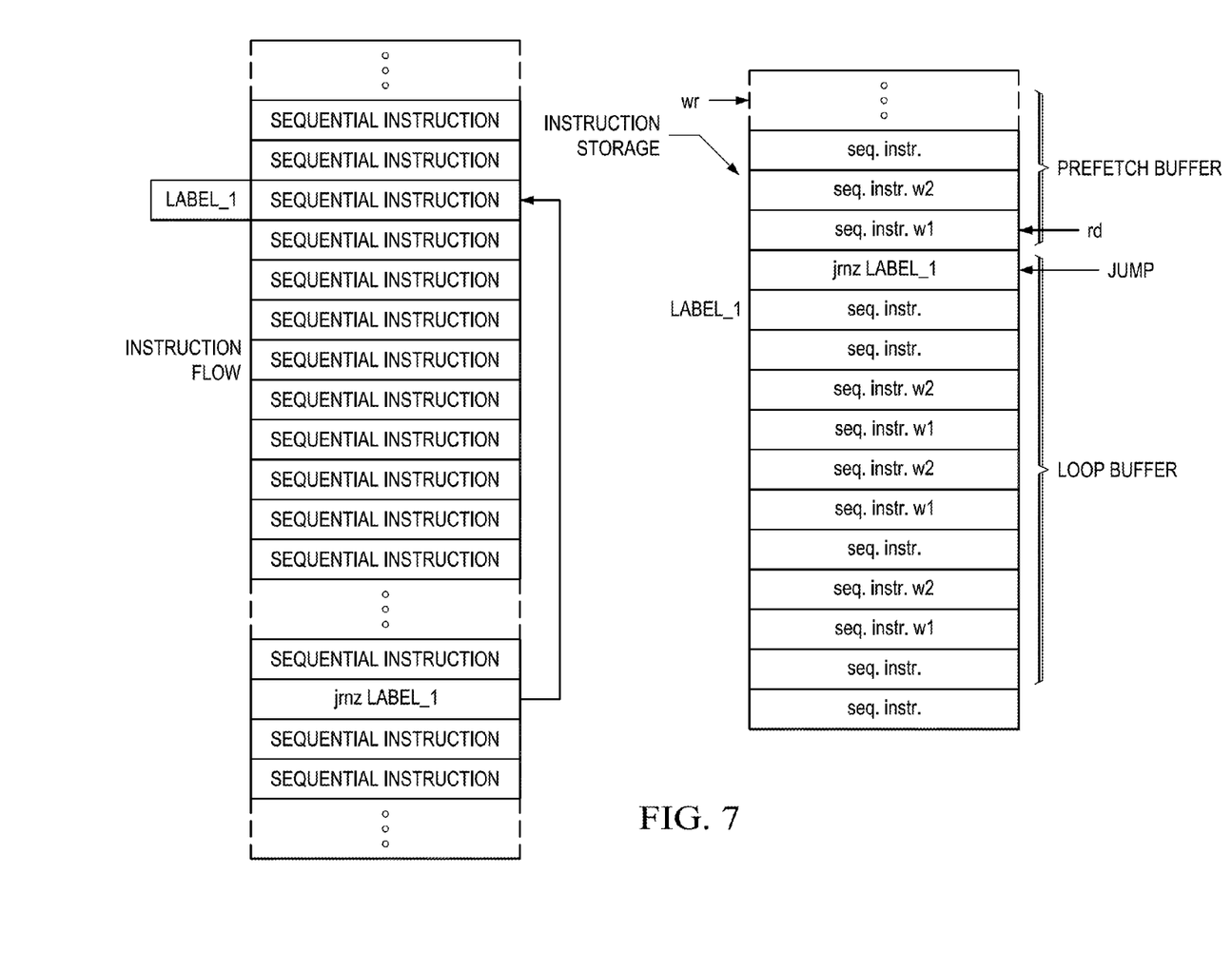

FIG. 7 shows an instruction loop identified by LABEL_1. The instruction flow of the loop, as stored in memory is shown, and the instructions as stored in the instruction storage 202 are shown. The instruction loop of FIG. 7 includes more instructions than can be concurrently stored in the instruction storage 202. The fetch buffer 104 can accelerate execution of such instruction loops. To accelerate such loops, the fetch/loop control logic 208 partitions the instruction storage 202 into a loop buffer portion and a pre-fetch buffer portion. Instructions located at the start of the loop are stored in the loop buffer portion, and instructions located at the end of the loop are fetched and executed from the pre-fetch buffer portion. When the loop jump instruction is executed from the pre-fetch buffer portion, the fetch/loop control logic 208 applies a pointer 204 to retrieve the destination instruction at LABEL_1 in the loop buffer portion, and initiates fetching of loop instructions immediately following the last instruction stored in the loop buffer portion into the pre-fetch buffer portion. Thus, while the start of the instruction loop is executing from the loop buffer portion, additional loop instructions are fetched into the pre-fetch buffer portion. The pre-fetch buffer portion operates as ring buffer where each instruction may be replaced after execution, while the start of the loop is retained in the loop buffer portion until looping is terminated. Because the initial portion of the loop is retained in the loop buffer portion, allowing time to fetch the end of the loop into the pre-fetch buffer portion, the fetch buffer 104 may provide loop acceleration (e.g., no stalls) for loops that are too large to be wholly stored in the instruction storage 202.

Figure 8:
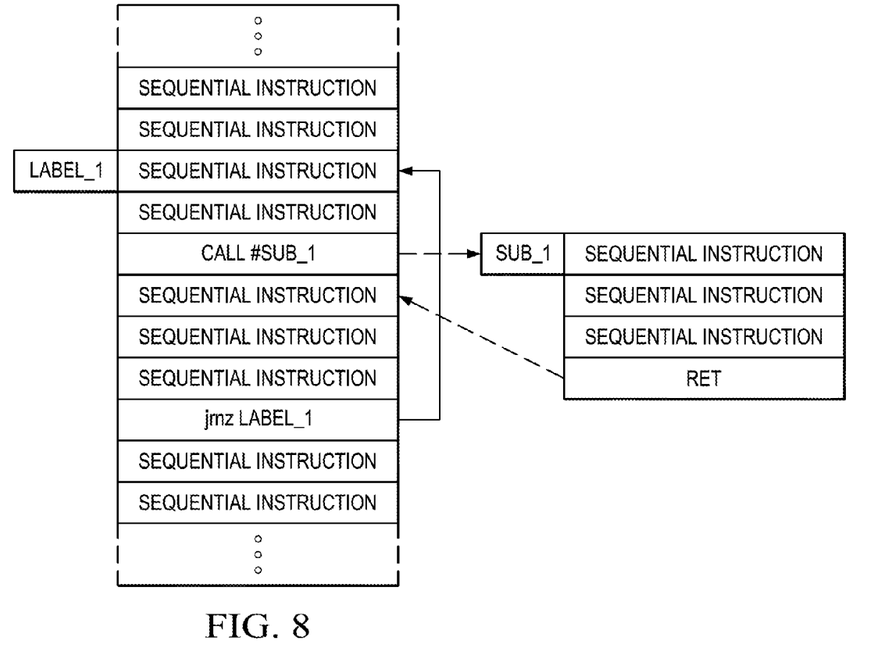

FIG. 8 shows an instruction loop that includes a subroutine call. The fetch buffer 104 can accelerate the instruction loop and handle the subroutine call without introducing stall cycles. When recording the instructions of the loop, the fetch/loop control logic 208 identifies, and sets pointers to, the call instruction and the destination of the call instruction. The instructions of the subroutine may be loaded into the instruction storage 202. The fetch/loop control logic 208 identifies, and sets pointers 204 to, the sub-routine return instruction and the return instruction destination. When executing the loop, the fetch/loop control logic 208 applies the pointers 204 to redirect program flow without introduction of stall cycles. In some embodiments the call instruction and/or the return instruction may not be provided from the loop buffer for execution. For example, when the read pointer is equal to the call instruction pointer, then rather than providing the call instruction for execution, the first instruction of the sub-routine may be provided for execution. In some embodiments, the call instruction and/or the return instruction may be eliminated/overwritten in the instruction storage 202 so that during execution of the loop the cycles for call and return instruction executing are saved and the number of instructions stored in the instruction storage 202 is reduced. In some embodiments, the instruction storage 202 may be partitioned into a loop buffer portion and pre-fetch buffer portion as explained with regard to FIG. 7, and the subroutine fetched into the pre-fetch buffer portion for execution. In other embodiments, the entirety of the instruction loop and sub-routine called may be stored in the instruction storage 202.

Figure 9:
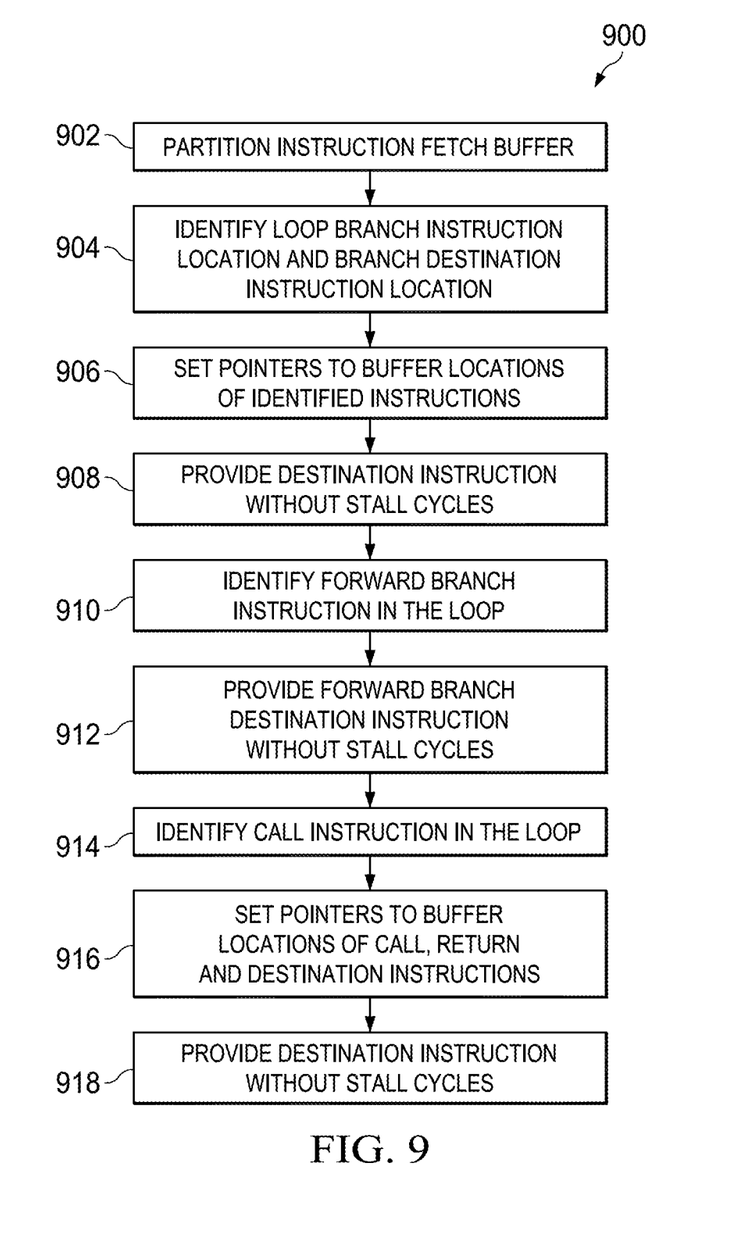
FIG. 9 shows a flow diagram for a method for loop buffering and execution in accordance with various embodiments.

FIG. 9 shows a flow diagram for a method 900 for loop buffering and execution in accordance with various embodiments. Though depicted sequentially as a matter of convenience, at least some of the actions shown can be performed in a different order and/or performed in parallel. Additionally, some embodiments may perform only some of the actions shown.

In block 902, the instruction storage 202 is partitioned into a loop buffer and a pre-fetch buffer. The fetch/loop control logic 208 maintains instructions stored in the loop buffer portion until execution of an instruction loop is complete. The fetch/loop control logic 208 may replace instructions stored in the pre-fetch buffer portion after execution.

In block 904, the fetch/loop control logic 208 identifies an instruction loop (e.g., by identifying a loop start flag or loop branch instruction), and identifies the location in the instruction storage 202 of the loop branch instruction and the destination of the loop branch instruction (i.e., the loop start instruction).

In block 906, the fetch/loop control logic 208 sets one of the pointers 204 to the location the loop branch instruction in the instruction storage 202, and sets one of the pointers 204 to the location of the loop start instruction in the instruction storage 202.

In block 908, the instruction loop is being executed from the fetch buffer 104, and the fetch/loop control logic 208 provides the instruction at the loop branch destination address without introducing stall cycles in the processor pipeline. In some embodiments, stall cycles may be introduced, but the number of stall cycles is reduced relative to fetching from external instruction memory.

In block 910, the fetch/loop control logic 208 identifies a forward branching instruction in the instruction loop. The forward branch may be provided as part of an if-then-else type conditional construct.

In block 912, the forward branch instruction is provided from the instruction storage for execution, the buffer read pointer is updated in accordance with the offset value provided in the forward branch instruction, and the instruction at the destination of the forward branch is provided for execution without introduction of stall cycles.

In block 914, the fetch/loop control logic 208 identifies a subroutine call instruction in the instruction loop.

In block 916, the fetch/loop control logic 208 sets a pointer 204 to the location the call instruction in the instruction storage 202, sets a pointer 204 to the location of the destination in the call instruction in the instruction storage 202 (i.e., the start of the sub-routine being called), sets a pointer 204 to the location of the sub-routine return instruction in the instruction storage 202, and sets a pointer 204 to the location of the instruction following the call instruction (i.e., the instruction executed on return from the sub-routine).

In block 918, the fetch/loop control logic 208 provides the call instruction from the instruction storage 202 for execution, and subsequently provides the first instruction of the sub-routine (as indicated by the aforementioned pointer 204) for execution without introducing stall cycles. Similarly, fetch/loop control logic 208 provides the return instruction from the instruction storage 202 for execution, and subsequently provides the instruction following the call instruction (as indicated by the aforementioned pointer 204) for execution without introducing stall cycles. In some embodiments, rather than providing the call and/or return instruction for execution, the instruction at the buffer location corresponding to the target of the call or return instruction is provided for execution.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A processor, comprising:
   an execution unit configured to execute instructions; and
   an instruction fetch buffer configured to store instructions for execution by the execution unit, the instruction fetch buffer comprising:
      a loop buffer configured to store instructions of an instruction loop for execution by the execution unit, the loop buffer comprising buffer control logic configured to:
         predecode a loop jump instruction;
         identify loop start and loop end instructions using the predecoded loop jump instruction and pointers; and
         control non-sequential instruction execution of the instruction loop using the pointers;
      wherein width of the pointers is determined by loop buffer length and is less than a width of an address bus for fetching the instructions stored in the loop buffer from an instruction memory.

2. The processor of claim 1, wherein the buffer control logic is configured to apply pointer arithmetic to determine which instruction in the loop buffer is destination of a branch instruction.

3. The processor of claim 1, wherein the buffer control logic lacks address comparators for use in determining loop branch destinations.

4. The processor of claim 1, wherein the buffer control logic is configured to identify an instruction loop in the loop buffer by identifying a loop identification instruction stored before or at a start of the instruction loop.

5. The processor of claim 1, wherein the buffer control logic is configured to identify an instruction loop in the loop buffer by identifying a branch instruction at an end of the instruction loop.

6. The processor claim 5, wherein the buffer control logic is configured to identify which instructions, stored in the instruction fetch buffer, are executed as part of the instruction loop.

7. The processor of claim 1, wherein the buffer control logic is configured to:
   service a plurality of nested loops without stall cycles and without fetching loop instructions from instruction memory during instruction loop execution; and
   identify a forward branch in an instruction loop, and provide the forward branch without stall cycles and without fetching instructions from instruction memory during instruction loop execution.

8. The processor of claim 7, wherein the buffer control is configured to provide the plurality of nested loops and forward branch using no more than four pointers to access the loop buffer.

9. The processor claim 1, wherein the instruction fetch buffer comprises a pre-fetch buffer that is separate from the loop buffer; wherein the loop buffer is configured to store instructions at the start of the instruction loop, and the pre-fetch buffer is configured to store instructions of the instruction loop not stored in the loop buffer.

10. The processor of claim 1, wherein the loop buffer is configured to store instructions of a sub-routine called from within an instruction loop stored in the loop buffer, and the buffer control logic is configured to apply the pointers and pointer arithmetic to branch between the instruction loop and the sub-routine without introducing stall cycles and without fetching instructions from instruction memory during instruction loop execution.

11. An instruction fetch buffer, comprising:
   a loop buffer configured to store instructions of an instruction loop for execution by an execution unit, the loop buffer comprising:
      buffer control logic comprising pointers, and configured to:
         identify loop start and loop end instructions using the pointers;
         identify which instructions, stored an instruction buffer, are executed as part of the instruction loop; and
         control non-sequential instruction execution of an instruction loop;
      wherein width of the pointers is determined by loop buffer length and is less than a width of an address bus for fetching the instructions stored in the loop buffer from an instruction memory.

12. The instruction fetch buffer of claim 11, wherein the buffer control logic is configured to set a first of the pointers to identify a location of a loop branch instruction and set a second of the pointers to identify a location of an instruction that is a destination of the loop branch instruction.

13. The instruction fetch buffer of claim 11, wherein the buffer control logic is configured to:
   identify an instruction loop in the loop buffer by identifying a loop identification instruction stored at a start of the instruction loop, or
   identify an instruction loop in the loop buffer by identifying a branch instruction at an end of the instruction loop.

14. The instruction fetch buffer of claim 11, wherein the buffer control logic is configured to:
   provide a plurality of nested loops without stall cycles and without fetching loop instructions from instruction memory during instruction loop execution; and
   identify a forward branch in an instruction loop, and provide the forward branch without stall cycles and without fetching instructions from instruction memory during instruction loop execution.

15. The instruction fetch buffer of claim 11, wherein the buffer control logic is configured to:
   predecode a loop jump instruction;
   apply the predecoded loop jump instruction to identify loop start and loop end instructions.

16. The instruction fetch buffer of claim 11, further comprising a pre-fetch buffer that is separate from the loop buffer; wherein the loop buffer is configured to store instructions at a start of the instruction loop, and the pre-fetch buffer is configured to store instructions of the instruction loop not stored in the loop buffer.

17. The instruction fetch buffer of claim 11, wherein the loop buffer is configured to store instructions of a sub-routine called from within an instruction loop stored in the loop buffer, and the buffer control logic is configured to apply the pointers to branch to and from the sub-routine during execution of the instruction loop without introducing stall cycles and without fetching instructions from instruction memory during instruction loop execution.

18. The instruction fetch buffer of claim 17, wherein the loop buffer is configured to:
   provide an initial instruction of the sub-routine for execution in lieu an instruction that calls the subroutine from the instruction loop; and
   provide an instruction of the instruction loop to which the sub-routine returns on completion in lieu of a return instruction of the sub-routine.

19. A method, comprising:
   partitioning instruction storage of an instruction fetch buffer into a loop buffer and a pre-fetch buffer;
   storing instructions of an instruction loop read from an instruction memory in the loop buffer;
   identifying, by loop control logic of the loop buffer, a location of a loop branch instruction stored in the loop buffer and a location of a branch destination of the loop branch instruction in the loop buffer;
   setting, by the loop control logic, a first pointer to the location of the loop branch instruction and setting a second pointer to a location of the branch destination of the loop branch instruction;
   providing, by the loop buffer, an instruction pointed to by the second pointer immediately subsequent to providing the loop branch instruction pointed to by the first pointer without introduction of stall cycles into execution;
   identifying a forward branch in the instruction loop stored in the loop buffer; and
   providing, by and from the loop buffer, while executing the instruction loop, an instruction at a branch destination location for the forward branch instruction immediately subsequent to providing the forward branch instruction without introduction of stall cycles into execution.

20. The method of claim 19, further comprising identifying an instruction loop in the loop buffer by identifying one of a loop identification instruction stored in the instruction fetch buffer before or at a start of the instruction loop and a loop branch instruction stored in the instruction fetch buffer at an end of the instruction loop.

21. The method of claim 19, further comprising providing a plurality of nested loops without stall cycles and without fetching loop instructions from instruction memory during instruction loop execution.

* * * * *